Patented May 31, 1927.

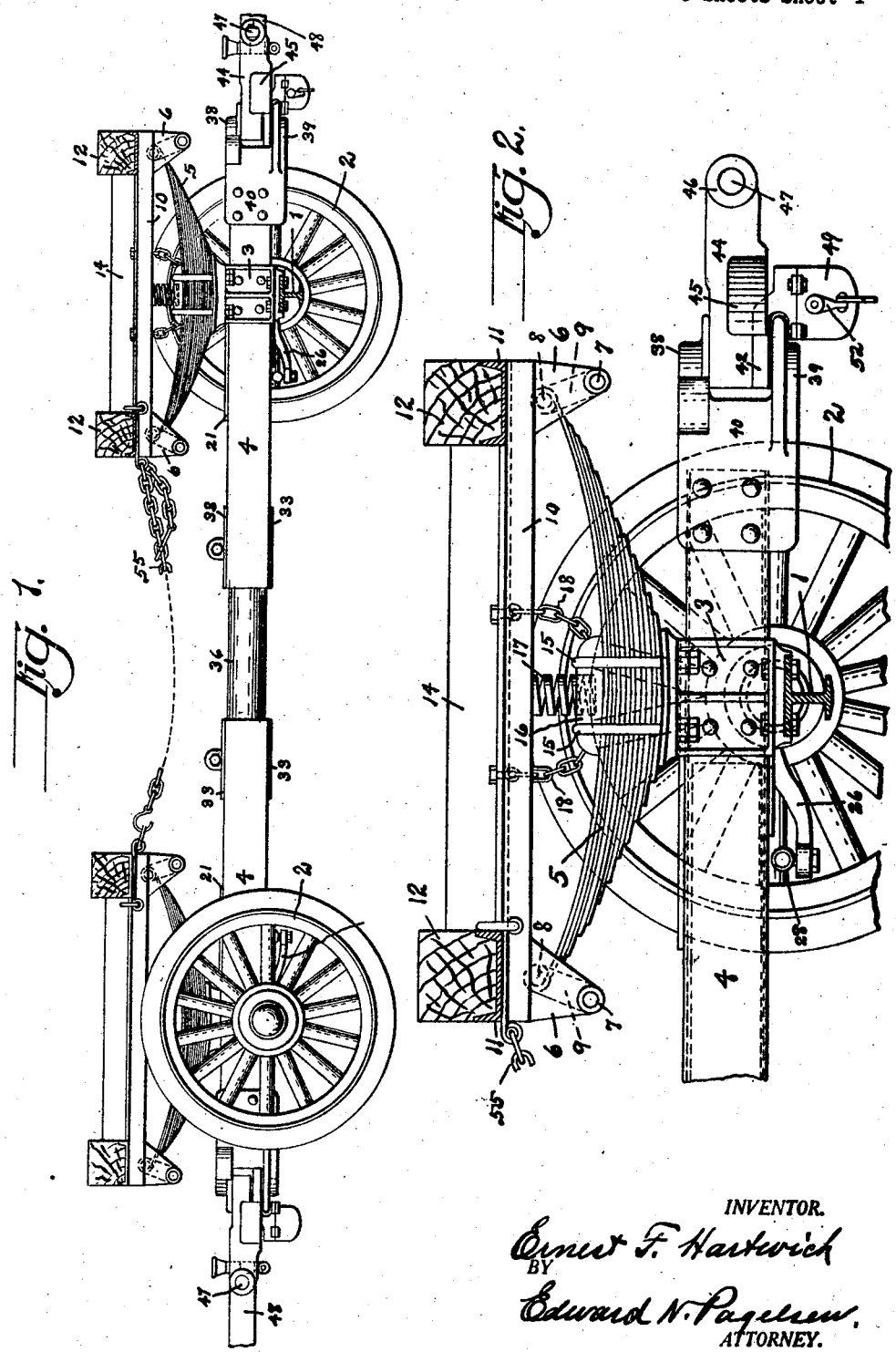

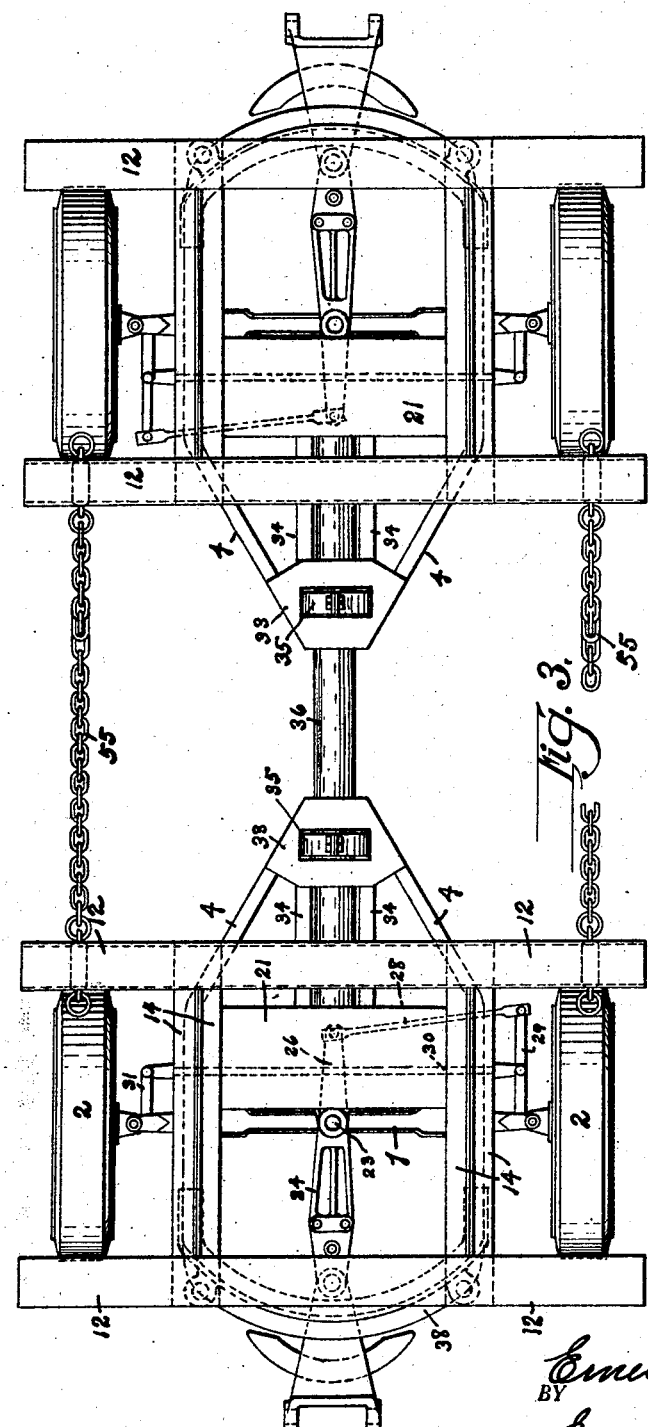

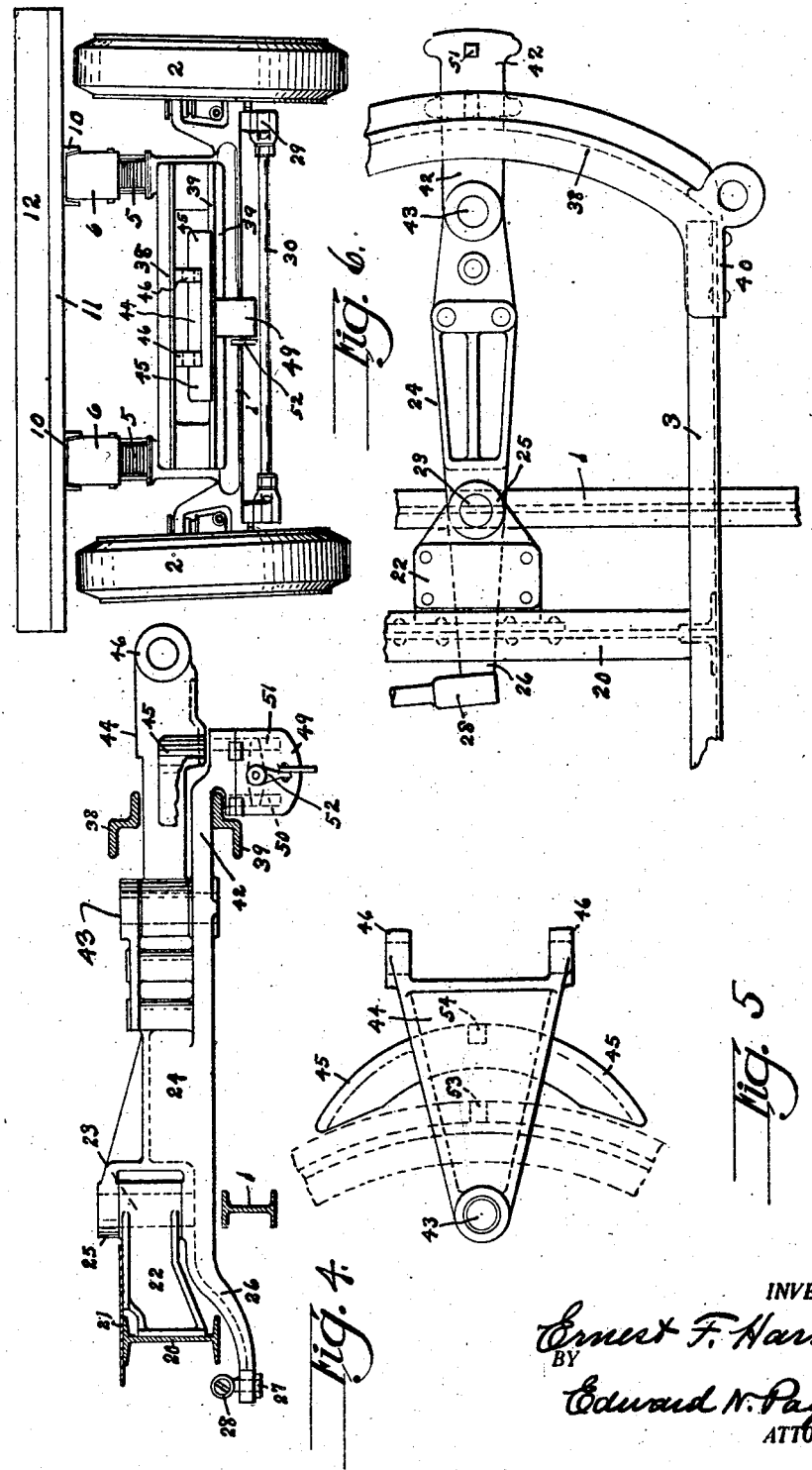

1,630,425

UNITED STATES PATENT OFFICE.

ERNEST F. HARTWICK, OF DETROIT, MICHIGAN, ASSIGNOR TO DETROIT TRAILER COMPANY, OF DETROIT, MICHIGAN, A CORPORATION OF MICHIGAN.

TRAILER.

Application filed May 6, 1922. Serial No. 558,932.

This invention relates to the construction of trailers consisting of similar front and rear trucks, each provided with steering mechanism, a stiff reach extending between the trucks so that the rear truck may be steered by the former, and its object is to provide a trailer which shall have great capacity, which shall have great strength, and which can be easily handled.

In the accompanying drawings, Fig. 1 is a side elevation of a trailer embodying my invention, one of the wheels being broken away for the sake of clearness. Fig. 2 is a side elevation of a trailer truck with one of the wheels broken away and the draft connection omitted for the sake of clearness. Fig. 3 is a plan of a trailer. Fig. 4 is a side elevation of the draft and steering mechanism of one of the trailer trucks. Fig. 5 is a plan of the front part of the draft and steering mechanism. Fig. 6 is an end elevation of one of these trucks. Fig. 7 is a plan of a draft and steering mechanism, the upper portions of the truck being left off.

Similar reference characters refer to like parts throughout the several views.

This trailer consists of two similar trucks and a reach between them, and each truck has an axle 1 to which are connected the usual stub-shafts which carry the wheels 2. Each axle near its ends and just within the steering knuckles carries the saddles 3 which support the channel side frame bars 4. A pair of springs 5 are balanced on each axle above the frame bars and the upper ends of these springs are connected to the brackets 6 by means of pins 7 and 8 and links 9. The brackets are attached to the lower sides of the channel side bars 10 on which rest the channel cross bars 11 and the timbers 12. On the side bars 10 are pairs of angle spacing bars 14. The U-bolts 15 that hold the springs onto the saddles also secure the bases 16 for the coil springs 17. Short safety chains 18 may be employed if desired. As shown in Fig. 3, the cross bars 11 and timbers 12 extend beyond the tractor wheels and thus prevent beams and timbers while being loaded or unloaded from falling onto the wheels. The side bars 10, cross bars 11, timbers 12 and spacing bars 14 together constitute what is known as bunks, which have a limited rocking movement in all directions because of the springs being balanced on the axles.

Between and attached to the middle portions of the side frame bars 4 are the transverse I-beams 20 (Fig. 7) and to these I-beams are attached the plates 21. Extending outward from each I-beam is a bracket 22 (Fig. 4) which carries a king-bolt 23 central over the axle 1. Attached to this kingbolt is a main or inner draw-bar 24 (Fig. 7) which has an upper portion 25 provided with an eye to receive the king-bolt 23, and an arm 26 which also receives the king-bolt and extends inwardly beyond that point and has a pin 27 at its end. A drag link 28 connects to this pin and to a steering arm 29 of one wheel 2 while a parallel link 30 connects this arm to the steering arm 31 of the other wheel 2.

It will be noticed that the effective length of the arm 26 is less than that of the arm 29 so that the wheels 2 will be swung through a lesser angle than the draw bar. As a result, the wheels will follow the outside lines of road curves so that a number of these vehicles may be hitched together for hauling timbers and logs while being drawn by a single tractor.

The inner ends of the side frame bars 4 are bent toward each other and connected by plates 33. Parallel bars 34 may extend from between the plates 33 to below the main plate 21 up to the transverse I-beam 20. The plates 33 are slotted to receive the adjustable collars 35 which grip the reach 36 extending to the other truck of the vehicle. This reach is preferably a tube of great transverse stiffness so that the rear truck will follow the leading truck, and the grip of the collars 35 must be sufficiently great to transmit pull from one truck to the other. Any other desired connection may be employed between the trucks and the reach.

Extending between the outer ends of the side frame bars 4 of each truck are two curved bars 38 and 39 parallel to each other and having their ends connected to the bars 4. These bars 38 and 39 are preferably integral with the side plates 40. The outer end 42 of the main draw bar 24 is slidably mounted on the lower curved bar 39 and carries a pin 43 on which the outer or auxiliary draw bar 44 is mounted. This draw bar 44 is also movable between the bars 38 and 39 and has curved arms 45 extending from each side, and forwardly extending lugs 46 provided with holes to receive the pin 47 on which the draw link 48 may be mounted.

Below the outer end 42 of the main draw bar is a case 49 which carries two pins 50 and 51 (Fig. 4) adapted to be alternately lifted or dropped by the lever 52 and these pins are adapted to engage in the notches 53 in the lower curved bar 39 and 54 in the auxiliary or front draw bar 44. See Fig. 5. This construction of a main draw bar 24, auxiliary draw bar 44, curved guide bars 38 and 39 and locking pins 51 forms no part of the present invention as it is old and well known.

When a truck is to be the front end of the vehicle, the pin 50 is depressed and the pin 51 elevated to lock the auxiliary draw bar 44 to the main draw bar 24, so that the two act as one bar. When the truck is to be the rear end of the vehicle, the pin 50 is elevated to enter the notch 52 and lock the main draw bar centrally of the truck and to cause the wheels controlled thereby to remain parallel to the reach. The swing of the member 44 is limited by the arms 45 which extend down into the plane of the upper portion of the bar 39.

When a trailer is hauled empty, the adjustable chains 55 (Figs. 1 and 3) between the bunks of the front and rear trucks of the trailer prevent side thrusts from breaking the reach.

As stated before, the reach is provided for steering and hauling purposes and the bunks have a limited rocking movement on the axle without straining the reach. This permits the load to adjust itself to the bunks and as these are balanced on the axle, a great freedom of movement is obtained and maximum loads can be carried without straining any of the parts when rough roads cause twisting of the vehicle. The reach can turn freely in at least one of the trucks so that the tilting movement of one truck is communicated to the other only through the load and this twisting is easily taken care of by the springs and the connections between the springs and bunks. The short safety chains 18 prevent the bunks from swinging too far. This trailer is therefore adapted for heavy hauling over the worst roads and such vehicles can be coupled into trains to be pulled along by a single tractor. There is never any load on the reach and it may therefore be made comparatively light, all the stresses thereon resulting only from the hauling and steering.

When the vehicle is loaded with beams or logs, the side stresses on the reach are so small that a chain might be used in place of the tube.

The details of construction can all be changed by those skilled in the art without departing from the spirit of my invention as set forth in the following claims.

I claim:—

1. A vehicle consisting of a pair of trucks, each embodying an axle, wheels therefor, a pair of springs mounted on the axle and a bunk mounted on the springs, means connecting the bunks to transmit tractive force from one truck to the other, a reach rotatably mounted in both trucks whereby one may be hauled and steered by the other and means to prevent longitudinal movement of the reach relative to the trucks.

2. A vehicle consisting of a pair of trucks, each embodying an axle, wheels thereon and a frame mounted on the axle, a pair of springs balanced on the axle above the frame, a bunk mounted on each pair of springs and having a limited rocking movement in all directions relative to the frame, a reach rotatably mounted in one truck to transmit traction from one to the other and permit rolling movement between them one of said frames being formed with a socket wherein said reach is rotatably mounted, and with a recess transversely to the socket, and a collar on the reach mounted in said recess to prevent longitudinal movement of the reach in the frame.

3. In a vehicle, a pair of trucks, each embodying an axle, wheels thereon and a frame mounted on the axle, a reach rotatably mounted in one truck to transmit traction from one truck to the other and permit rolling movement between them, one of said frames being formed with a socket wherein said reach is rotatably mounted.

4. In a vehicle, a pair of trucks, each embodying an axle, wheels thereon and a frame mounted on the axle, a reach rotatably mounted in one truck to transmit traction from one truck to the other and permit rolling movement between them, one of said frames being formed with a socket wherein said reach is rotatably mounted and with a recess transversely to the socket, and a collar in said recess and attached to the reach to prevent longitudinal movement of the reach in the socket.

ERNEST F. HARTWICK.